June 19, 1923.

R. R. HUGHES, JR

SEWING MACHINE

Filed Oct. 17, 1919

Inventor

Robert R. Hughes Jr.

By Sturtevant & Mason

Attorneys

June 19, 1923.

R. R. HUGHES, JR 1,459,103

SEWING MACHINE

Filed Oct. 17, 1919

Inventor
Robert R. Hughes Jr.
By Sturtevant & Mason
Attorneys

June 19, 1923.

R. R. HUGHES, JR 1,459,103

SEWING MACHINE

Filed Oct. 17, 1919 10 Sheets-Sheet 7

Inventor

Robert R. Hughes Jr.

By Sturtevant Mason

Attorneys

June 19, 1923.

R. R. HUGHES, JR
SEWING MACHINE
Filed Oct. 17, 1919

Inventor
Robert R. Hughes Jr
By Sturtevant & Mason
Attorneys

June 19, 1923.

R. R. HUGHES, JR

SEWING MACHINE

Filed Oct. 17, 1919  10 Sheets-Sheet 9

Inventor

Robert R. Hughes Jr

By Sturtevant Mason

Attorneys

Patented June 19, 1923.

1,459,103

UNITED STATES PATENT OFFICE.

ROBERT R. HUGHES, JR., OF UTICA, NEW YORK, ASSIGNOR TO UNION SPECIAL MACHINERY COMPANY, OF CHICAGO, ILLINOIS, A CORPORATION OF ILLINOIS.

SEWING MACHINE.

Application filed October 17, 1919. Serial No. 331,312.

*To all whom it may concern:*

Be it known that I, ROBERT R. HUGHES, Jr., a citizen of the United States, residing at Utica, in the county of Oneida, State of New York, have invented certain new and useful Improvements in Sewing Machines, of which the following is a description, reference being had to the accompanying drawing and to the figures of reference marked thereon.

The invention relates to new and useful improvements in sewing machines, and more particularly to a sewing machine for applying a facing strip, button stay strip, binding, or the like to garments.

An object of the invention is to provide a sewing machine of the above character having means for slitting the garment and applying a stay strip or binding to one edge portion of the slit.

A further object of the invention is to provide a machine of the above character wherein a facing is simultaneously applied to the other edge of the slit so that the garment is cut and both edges thereof simultaneously faced and finished.

A still further object of the invention is to provide a machine of the above character with slitting mechanism operating in advance of the stitching mechanism for slitting the fabric, which slitting mechanism is manually controlled for cutting a relatively long strip within the marginal edges of the fabric either at the beginning or finishing operation.

Another object of the invention is to provide a sewing machine having a suspended work supporting arm with stitching mechanism constructed so that the needles may be widely spaced and placed close to the side faces of the arm whereby other needles may be placed intermediate said widely spaced needles centrally of the arm.

These and other objects will in part be obvious and will in part be hereinafter more fully disclosed.

In the drawings, which show by way of illustration one embodiment of the invention:—

General construction.

I have shown the invention as applied to a sewing machine of what is known as the side-wheel type. Said machine is provided with a supporting base 1 carrying a standard 2, which terminates in an overhanging arm 3. Extending outwardly from this standard is a work support 4 which is of the suspended arm type, so that the material being stitched may be fed on to said arm, there being free space beneath the arm for the handling of the material. Extending transversely through the standard is a main operating shaft 5. Said main operating shaft is driven by a suitable wheel.

The needles are reciprocated from the main shaft through a needle lever, and in the present embodiment of the machine said needle mechanism includes two needles which are preferably closely spaced and which may be used for covering one of the edges of the slit formed in the garment, and two widely spaced needles which are disposed so that one of said needles operates upon one extreme edge of the button stay at one side of the slit, while the other operates upon the extreme inner edge of the facing strip at the other side of the slit. There is a separate looper cooperating with each of the widely spaced needles, and preferably a single looper cooperating with the closely spaced needles so that the looper thread may be used for covering the raw edge of the material.

The material is fed to the stitching mechanism by a feeding mechanism which feeds the material up or onto the arm. Said feeding mechanism preferably includes differentially operated feed dogs disposed so as to operate upon the body fabric to prevent stretching of the same. In advance of the stitching mechanism there is a cutting mechanism for slitting the garment, and said cutting mechanism includes an auxiliary cutter which may be manually operated for piercing and cutting a relatively long slit within the marginal edges of the garment. Between the slitting mechanism and the stitching mechanism are suitable folders and guides for the facing strips.

The invention will be better understood by a detailed description of the various organized mechanisms which I have brought together in carrying out the invention.

Stitching mechanism.

The stitching mechanism in the present embodiment of the invention includes two closely spaced needles 6 and 7. These needles are carried by a needle bar 10. Said needle bar carries a cross head 11 at the lower end of which the needles are mounted. The stitching mechanism also includes two widely spaced needles 12 and 13. These needles are carried by the cross head 11. All four needles are, therefore, reciprocated by the one needle bar 10. Said needle bar is mounted in the overhanging arm and is reciprocated by a needle lever 14 which is pivoted at 15 to the overhanging arm. Said needle lever is oscillated by a pitman 16 which cooperates with an eccentric on the main shaft 5. The outer end of the needle lever 14 is connected by a link 17 to a lug 18 which is clamped to the needle bar so that, as the needle lever oscillates, the needle bar will be reciprocated.

Cooperating with the needles 6 and 7 beneath the work support is a thread-carrying looper 19. This looper, cooperating with both needles, forms the usual twin needle stitch. Said looper 19 is fixed to the outer end of a shaft 20 which is mounted in suitable bearings in the work supporting arm 4 so that said shaft may not only be freely oscillated but may also be moved endwise. The oscillations of the shaft cause the looper to enter and to leave the needle loops, and the endwise movement of the shaft gives a lateral or needle avoiding movement to the looper.

Figure 1:
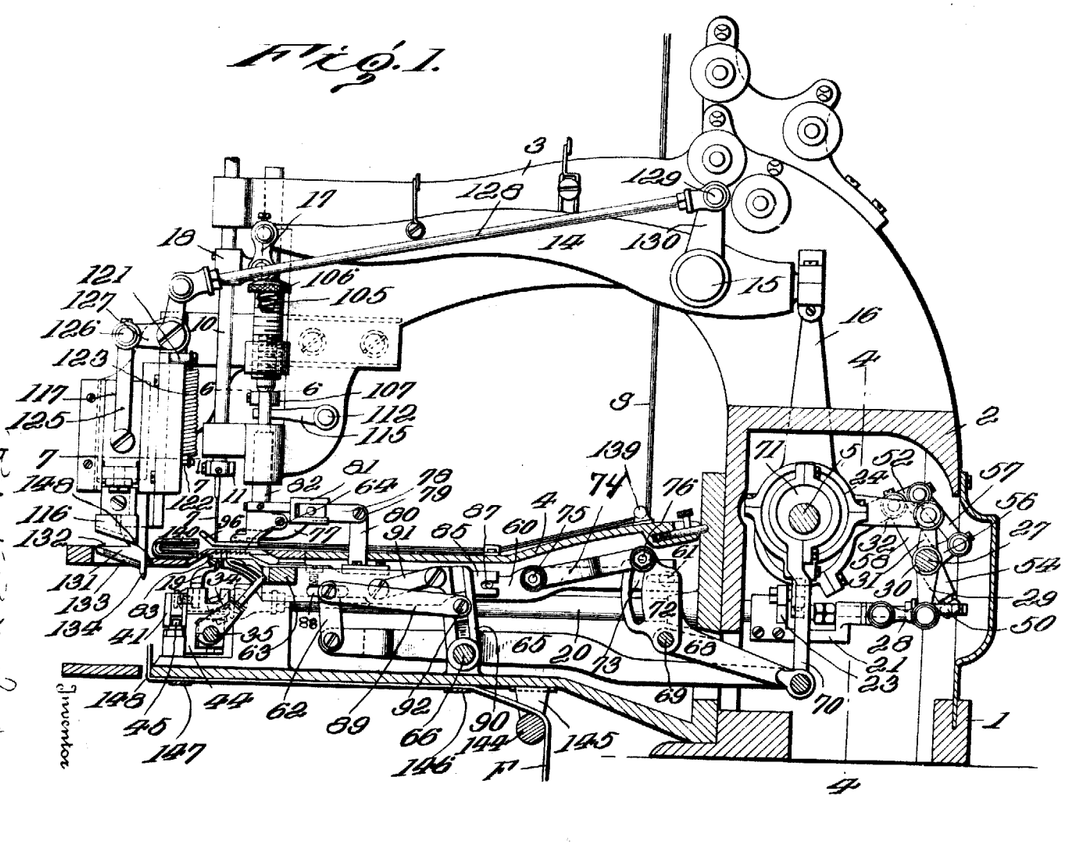
Figure 1 is a view, partly in side elevation and partly in longitudinal section, showing a machine embodying my improvements.
Figure 2:
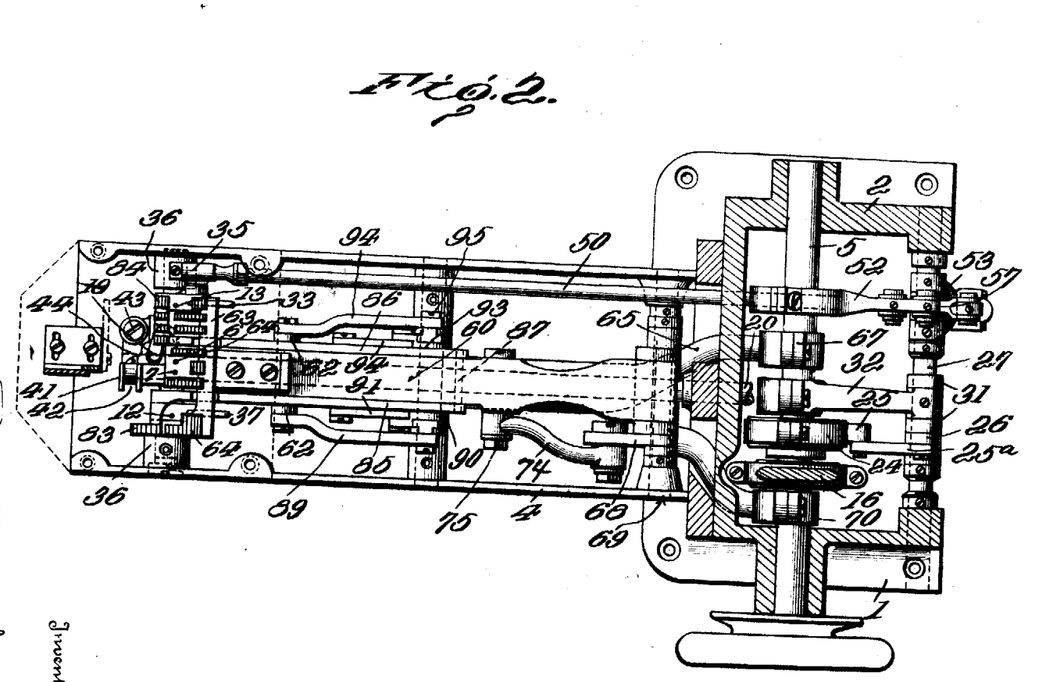
Fig. 2 is a view, partly in plan and partly in transverse section, of the same, the cover plate for the work supporting arm being removed.
Figure 3:
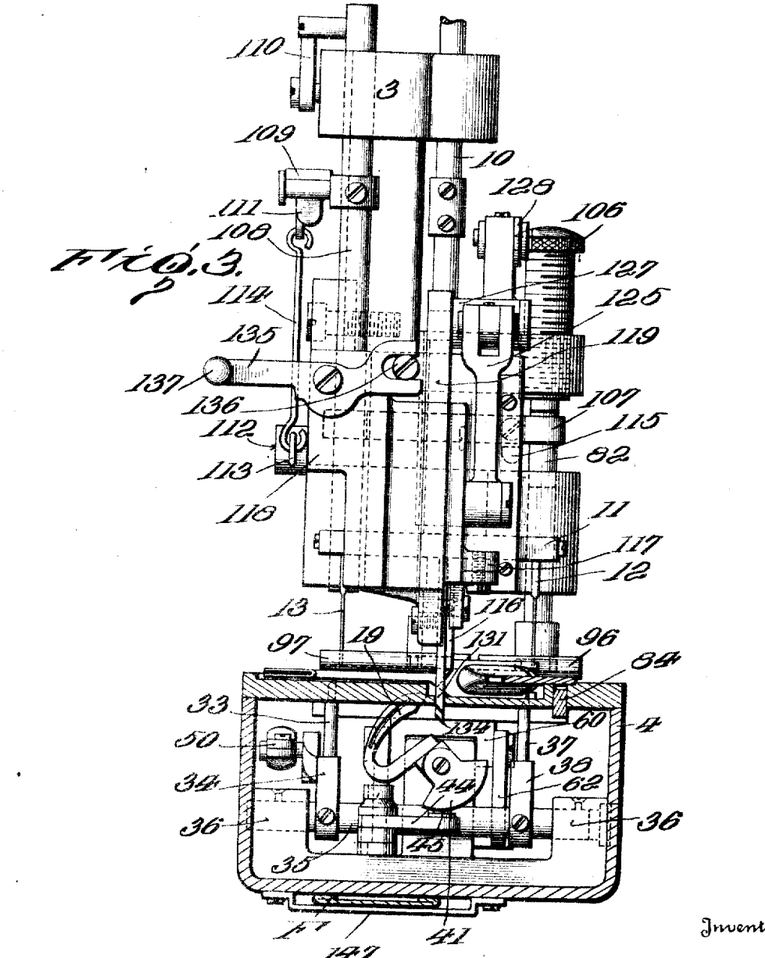
Fig. 3 is a view, partly in end elevation and partly in transverse section, through the work support at a point in advance of the slitting mechanism.
Figure 4:
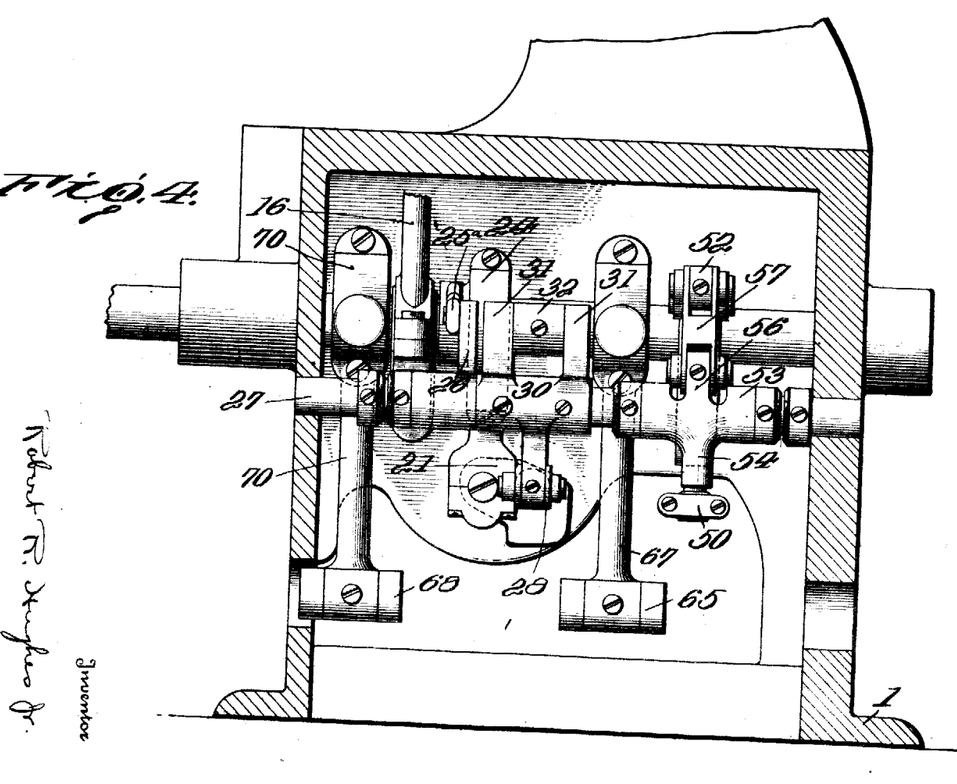
Fig. 4 is a sectional view on the line 4—4 of Fig. 1.
Figure 5:
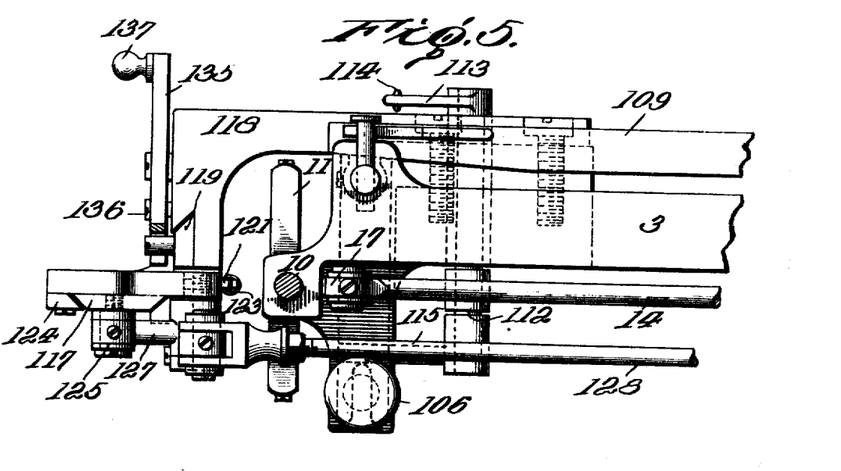
Fig. 5 is a view in top plan of the front end of the overhanging arm and the parts associated therewith.
Figure 6:
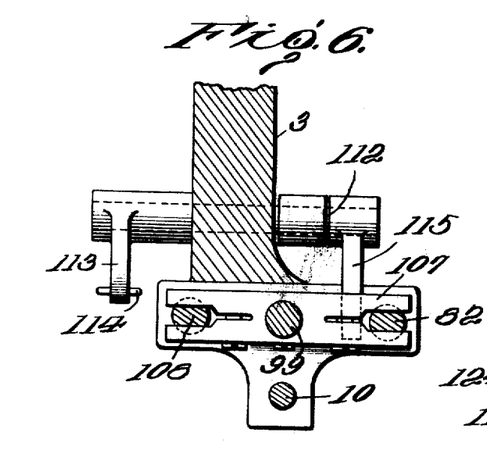
Fig. 6 is a sectional view on the line 6—6 of Fig. 1.

The shaft 20 is provided with a yoke 21 located within the standard 2, and this yoke has an outwardly projecting arm 23 with which an eccentric strap 24 cooperating with an eccentric on the shaft 5 is connected, see Figs. 1 and 4. This eccentric strap 24 is provided with a rearwardly projecting part 25 which is connected in turn by a link 25ª to an arm 26 freely mounted on a cross shaft 27. This causes the yoke to be freely oscillated and, at the same time, permits the yoke to be readily moved endwise for imparting the endwise movements to the looper shaft. Connected to the extreme rear end of the yoke is a link 28 which is pivoted at its outer end to an arm 29 carried by a sleeve 30 which is fixed to the shaft 27. Said sleeve 30 has two upwardly extending arms 31 between which is connected an eccentric strap 32 which cooperates with an eccentric on the main shaft. This eccentric produces the endwise movements of the looper shaft. This particular mechanism per se forms no part of my present invention and is of the usual type employed in sewing machines of the Union Special Machine Company.

Cooperating with the needle 13 is a looper 33. Said looper is carried by a looper support 34 which is fixed to a looper shaft 35 extending transversely of the work supporting arm 4 and mounted in the bearings 36—36. The opening for the looper supporting shaft 35 extends only part way into the work supporting arm at the left and entirely through the arm at the right, which opening at the right is closed by a cap so as to prevent any possible chance of oil leaking through these bearings for the looper shaft and soiling the garment being operated.

Figures 12, 13, 14:
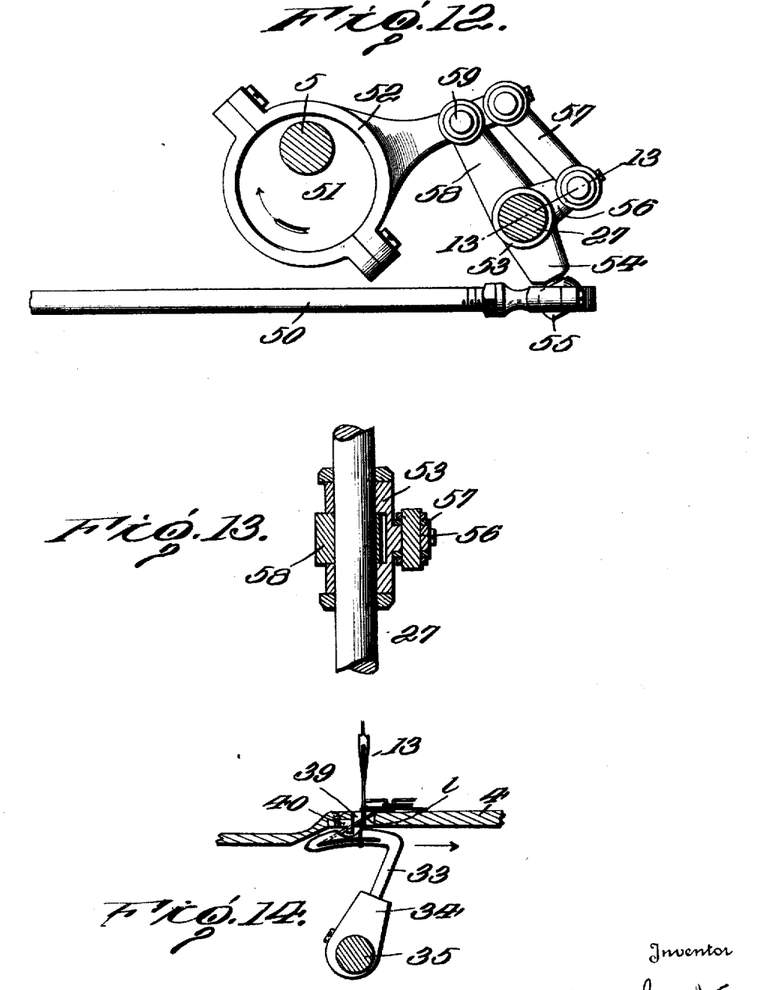
Fig. 12 is a detail showing the means for giving the loopers a differential movement.
Fig. 13 is a sectional view on the line 13—13 of Fig. 12.
Fig. 14 is a detail view showing, more or less diagrammatically, one of the loopers, the needle with which it is associated, the work support, and the retainer cooperating with the looper.

Cooperating with the needle 12 is a looper 37 which is mounted in a support 38 which is also clamped to the shaft 35. In Fig. 14 of the drawings, I have shown the looper 33. The looper 37 is similar in construction and in operation. This looper is a threaded looper and the looper thread is indicated at 1. The work supporting arm 4 is provided with a needle hole 39 through which the needle 13 passes. Directly in front of the needle hole and slightly to the left, as viewed from the front of the machine, is a thread retaining finger 40. This thread retaining finger is so positioned relative to the path of movement of the looper that, when the looper moves laterally for its needle avoiding movement, the looper thread 1 will remain against the thread retaining finger and held away from the body of the looper so as to insure the needle point passing between the looper thread and the body of the looper. The direction of feed is indicated by the arrow on this figure and, therefore, it will be noted that the looper moves not only in a line substantially parallel to the line of feed but in a direction opposed to the direction of feed when entering the needle thread loop.

Figure 11:
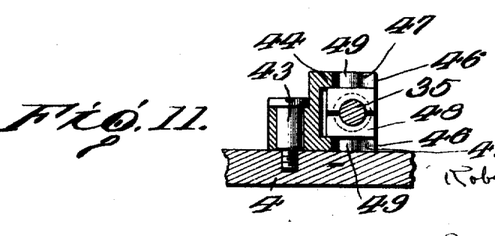
Fig. 11 is a sectional view through the means for moving the loopers laterally for their needle avoiding movement.

The loopers 33 and 37 are oscillated back and forth and are moved laterally for their needle avoiding movement. The needle avoiding movement is derived from a connection with the shaft 20 which supports and operates the looper 19. At the extreme outer end of said shaft there is an arm 41 which is formed with a concentric peripheral groove 42. Mounted on a suitable supporting pin 43 carried by the work supporting arm 4 is a rock lever 44. Said rock lever is provided with a roller 45 which engages the groove 42 so that, as the shaft 20 is moved endwise, this rock lever 44 will be oscillated. Referring to Fig. 11 of the drawings, it will be noted that the rock lever is provided with spaced arms 46 and each arm is slotted, as indicated at 47. Mounted on the looper supporting shaft 35 are blocks 48, each of which carries a pin 49 extending respectively into the slots in the arms 46. The shaft is free to rotate in the blocks 48, but said blocks are held from endwise movement on the shaft. This groove 42 is formed in a plane at right angles to the axis of the shaft 20 so that the oscillations of the shaft 20 do not produce any movement in the rock lever 44. Any endwise movement of the shaft 20, however, will cause the rock lever to oscillate. The endwise movements of the shaft 20 produce the needle avoiding movements for the looper 19, and through this rock lever it will simultaneously produce a needle avoiding movement for the loopers 33 and 37.

The shaft 35 carrying the loopers is oscillated by a link 50 which link is moved endwise by a mechanism shown in detail in Figs. 12 and 13 of the drawings. Mounted on the cross shaft 5 is an eccentric 51. Cooperating with the eccentric is an eccentric strap 52. Freely mounted on the cross shaft 27 is a yoke 53. Said yoke has a downwardly projecting arm 54 which carries a ball 55 with which the link 50 is connected. Said yoke is provided with a rearwardly extending arm 56 and a link 57 is connected at its lower end to this arm 56 and at its upper end to the eccentric strap 52. Freely mounted on the shaft 27 is a fulcrum arm 58 which is pivoted at 59 to the eccentric strap.

Figure 15:
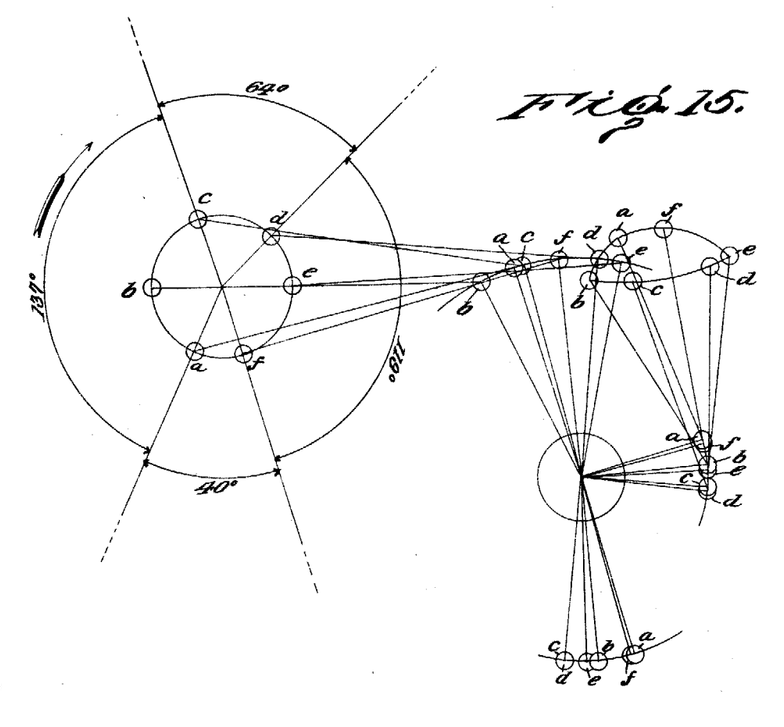
Fig. 15 is a diagrammatic view showing the movements imparted to the looper.

The operation of the means for oscillating the loopers 33 and 37 will be perhaps more clearly followed by reference to the diagram in Fig. 15. Assuming that the initial position of the eccentric strap is at $a$ in this figure the circles lettered $a$ indicate the respective positions of the fulcrum point 59, the link connection with the eccentric strap, the link connection with the yoke, and the yoke connection with the link 50 which is directly connected to the looper shaft for oscillating the same. The circles indicated at $b$ indicate another position of these parts, as do those at $c$, $d$, $e$ and $f$. Following these circles, it will be noted that the arm 58 moves back and forth with the eccentric strap 52 and this varies the angular position of said arm relative to the link 57. This, taken together with the fact that the link 57 and the eccentric strap arm approach and move away from a straight line position, give in part a differential movement to each looper. As a result of this, the looper moves forwardly into the needle loop comparatively quickly, where it is given more or less of an extended dwell, after which it is quickly retracted and is then given a dwell at the rear end of the stroke so that the looper is substantially at a dwell while it partakes of its lateral or needle avoiding movement.

From the above, it will be apparent that I have provided a looper operating mechanism for vibrating the looper which is free from cams and lost motion and, at the same time, positively imparts to the looper quick movements into and out of the needle loops with a dwell at each end of its stroke. This looper operating mechanism per se is shown, described and claimed in my copending application and, therefore, no claim is made thereto except in the general combination of devices for slitting and facing the garment.

Feeding mechanism.

The material being stitched is fed onto the work supporting arm 4, and this is brought about by means of a feeding mechanism which includes a main feed bar 60. Said main feed bar 60 is mounted to slide freely backward and forward on a supporting pin 61 at its rear end and is pivotally connected to links 62 adjacent its front end. Mounted on the feed bar is a bracket 63 which is provided with a series of fabric engaging feed dog sections 64. Certain of these feed dog sections are associated with the needles 6 and 7 and others are associated with the needle 13, while another section is associated with the needle 12. The feed bar 60 is raised and lowered by means of a lever 65. Said lever 65 is fulcrumed at 66 and is connected at its outer end to the links 62. There are two links 62, one at each side of the main feed bar 60. The lever 65 is raised and lowered by means of an eccentric strap 67 which cooperates with an eccentric on the main shaft 5, (see Fig. 4). As this lever 65 is vibrated up and down, the link 62 will be raised and lowered, and this will raise and lower the forward end of the feed bar, said feed bar turning about the supporting pin at the rear end thereof as a fulcrum.

The feed bar is also moved endwise by means of the lever 68 which is fulcrumed at 69. Said lever is connected at one end to an eccentric strap 70 which cooperates with an eccentric 71 on the main shaft 5. Said lever has an enlarged end 72 formed with a segmental slot 73. A link 74 is pivoted at 75 to the feed bar 60. This link is also pivoted to a bolt 76 which is adjustable in the segmental slot 73. As this lever 68 oscillates, the main feed bar is moved endwise and the amount of movement imparted thereto may be varied by shifting the bolt 76 in said segmental slot.

Figure 9:
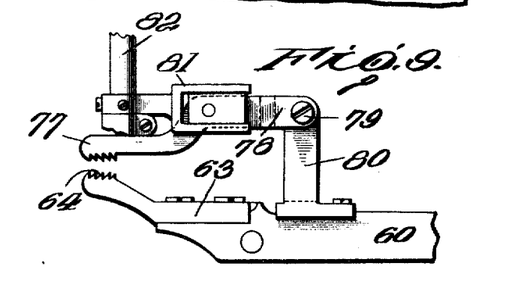
Fig. 9 is a detail view showing the connection between the upper feed dog and the main feed bar.
Figure 10:
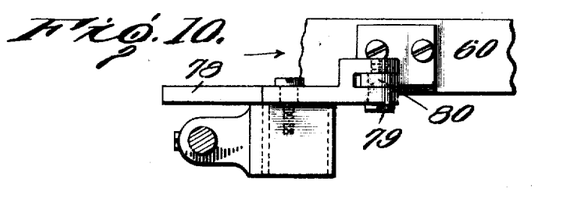
Fig. 10 is a top plan view of the upper feed dog, a portion of the feed bar, and showing the bracket carried by the presser bar for supporting the feed dog.

Associated with the main feed dog fabric engaging sections is an auxiliary feed dog 77, see Figs. 1, 9 and 10. Said feed dog 77 is located above the work support and is adapted to engage the upper face of the material being stitched for feeding the same. This feed dog is preferably located so as to engage the button stay strip for feeding the upper section thereof. The feed dog 77 is fixed to or formed as a part of a lever 78. Said lever is pivoted at 79 to a standard 80 which is carried by the main feed bar 60. Said lever 78 has a sliding action with a bracket 81 which is clamped to the presser bar 82. From the above, it will be apparent that the feed dog section 77 will move back and forward in unison with the feed dog fabric engaging section 64 directly beneath the same and will be moved away from the material as the lower feed dog section is moved away from the material. In other words, these feed dogs move vertically in opposite directions, owing to the fact that the lever 78 is carrying the upper feed dog section and is fulcrumed intermediate its ends.

Also associated with the fabric engaging sections of the main feed dog which cooperate with the extreme outer needles are auxiliary feed dog sections 83 and 84. These auxiliary feed dog sections are carried respectively by feed bars 85 and 86. The feed bars 85 and 86 are located alongside of the main feed dog 60 and have a sliding connection at their rear ends with a pin 87. Said feed bars are slotted at 88 so as to receive the pivot pins which secure the links 62 to the main feed bar. This permits the auxiliary feed bars 85 and 86 to have an independent endwise movement of the main feed bar 60, but said auxiliary feed bars move up and down with the main feed bar. The auxiliary feed bar 85 is moved endwise by means of a link 89 which is pivoted to an oscillating arm 90. This oscillating arm 90 is vibrated by means of a link 91 which is pivotally connected to the pivot bolt which attaches the link 62 to the main feed bar. The link 89 is connected to a bolt 92 which has a T-head and which is capable of radial adjustment in the arm 90. This provides a means for varying the throw of the auxiliary feed bar 85. The auxiliary feed bar 86 is moved back and forth by means of an arm 93. This arm is vibrated by means of a link 94 which is pivotally connected with the bolt which joins the other link 62 to the main feed bar. The link 94 is connected to a similar T-bolt 95 which is likewise adjustable in the arm 93 for varying the throw of the auxiliary feed bar. It will thus be seen that the two auxiliary feed bars move up and down with the main feed bar, and each auxiliary feed bar is moved endwise by independent devices so that the relative endwise movement of the auxiliary feed bars may not only be varied relative to the main feed bar but may be varied relative to each other.

*Presser feet and mechanism for supporting same.*

Associated with the feeding mechanism are two presser feet 96 and 97. The presser foot 96 is carried by the presser bar 82, and the presser foot 97 is carried by a bar 99. The presser foot 96 has a slot 100 formed therein for the needle 12. Said foot also has a slot 101 formed therein through which the upper feed dog 77 operates. The presser foot 97 has needle slots 102 and 103 for the needles 6 and 7 respectively, and also a needle slot 104 for the needle 13. The presser bar 82 is mounted in suitable bearings in the overhanging arm and is forced downwardly by means of a spring 105 located in a cap screw 106 threaded into the upper bearing for the presser bar 82. A cross head 107 is clamped to the presser bar 99 and also to the presser bar 82. This cross head is connected to an auxiliary bar 108 which is mounted to reciprocate in suitable bearings, and said bar is pressed downwardly by means of a spring 109. The bar is lifted by means of a hand lever 110 and also by means of a foot controlled lever 111 which is of the usual construction. Mounted in the overhanging arm is a cross shaft 112. This cross shaft is provided with an arm 113 which is connected by a link 114 to the foot lever 111. At the other end of the shaft 112 there is an arm 115 which extends underneath the cross head 107 and serves as a means for raising the presser bars and the presser feet carried thereby.

*Slitting mechanism.*

Figure 7:
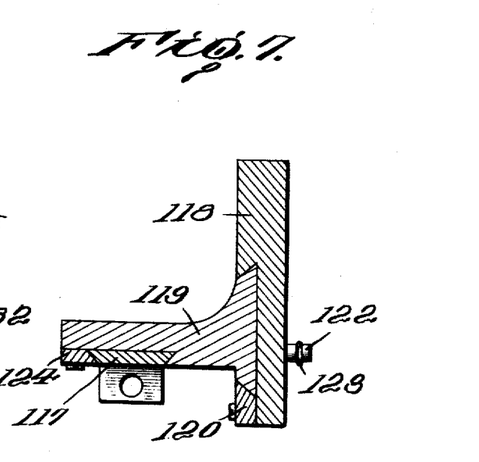
Fig. 7 is a sectional view on the line 7—7 of Fig. 1.
Figure 8:
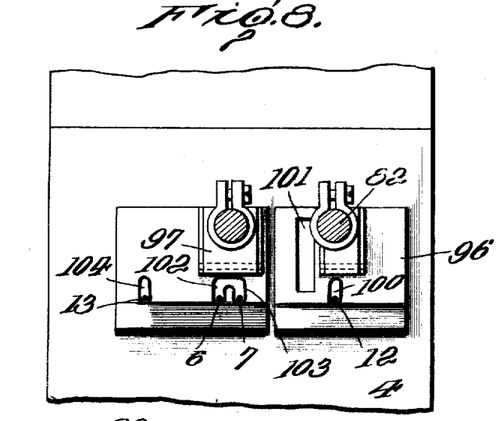
Fig. 8 is a plan view showing a portion of the work support and the presser feet for holding the material on the work support.

My improved machine is especially designed for the slitting of a body fabric and the finishing of the edge portions along the slit in the body fabric. As a means for slitting the fabric, I have provided cutting devices which consist of a movable cutting blade 116. This movable blade is detachably carried by a sliding head 117 (see Figs. 1 and 7). Mounted on the overhanging arm 3 is a bracket arm 118. Said bracket arm carries a sliding support 119. Said sliding support is dove-tailed in cross section and is held in place on the bracket arm by a removable plate 120. A pin 121 is secured to the bracket arm 118, and a pin 122 is secured to the sliding support 119. A spring 123 connecting these pins normally moves the sliding support downwardly until the pin 122 strikes the upper face of the bracket arm 118. The sliding head 117 carrying the movable blade 116 slides in the sliding support 119. Said sliding head has a dove-tailed base which fits in a dove-tailed recess in the sliding support, one side of which is formed by a removable plate 124. The sliding head is reciprocated in the support 119 by means of a link 125, which link is pivotally connected to the sliding head at its lower end and at its upper end is pivoted at 126 to a rock lever 127 pivotally carried by the bracket arm 118. The other arm of the rock lever 127 is pivoted to a link 128 which in turn is pivoted at 129 to an arm 130 rigid with the needle lever 114. As this needle lever oscillates, it will produce reciprocating movements in the movable cutter 116.

Cooperating with the movable cutter 116 is a normally stationary cutter 131. Said stationary cutter 131 is carried by and projects forwardly from a depending arm secured to the sliding support 119. This stationary cutter 131 is formed with an upper cutting ledge 132 with which the movable cutter 116 cooperates. This stationary cutter is also provided with a cutting blade 133 and a piercing point 134 at the rear end of the blade. The work supporting arm 4 is provided with a slot in which this normally stationary blade is located. The upper face 132 thereof is substantially flush with the upper face of the work support. The lever 135 is pivoted to the bracket arm 118 and the inner end of said lever straddles a pin 136 threaded into the sliding support 119. Said lever is provided with a handle 137 whereby it may be swung for raising the stationary cutter.

When the stationary cutter is raised, the opening between the blade 116 and the blade 131 is closed so that there is no chance of the operator's fingers coming into contact with the cutting blades when the goods is inserted in the machine. The stationary blade 131 is raised a sufficient distance to enable the fabric to be stitched to be placed underneath the same. When this blade is lowered, the piercing point 134 will pierce the fabric and the blade 133 will cut the fabric forming a slit therein, the length of which is the length of the blade 133. The length of this cutting blade from the piercing point to the extreme rear end thereof is substantially the distance between the rear side of the stationary cutting blade and the needle line so that after the slit is cut the fabric may be moved forward to bring the extreme inner end of the initially cut slit close to the stitching point, and to at least a point beyond the guiding devices, hereinafter described, as to allow the edge portions of the slit to be properly disposed relative to the guiding devices before the stitching operation begins.

*Fabric guiding devices.*

Figure 16:
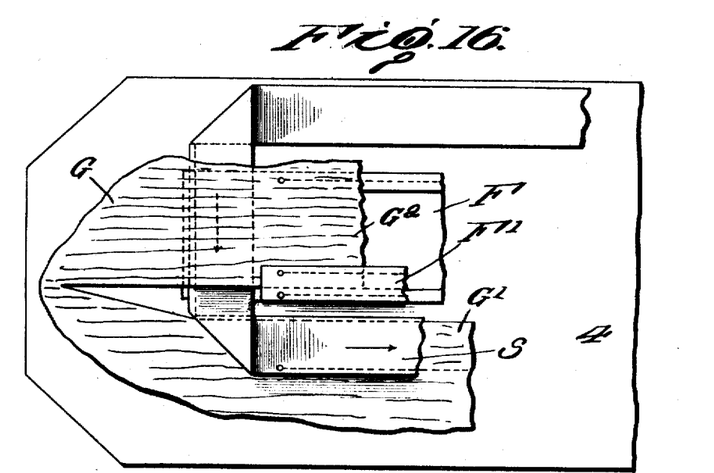
Fig. 16 is a view showing, more or less diagrammatically, a portion of the work support, the material being operated upon, and the manner of guiding the button stay strip to the machine.
Figure 17:
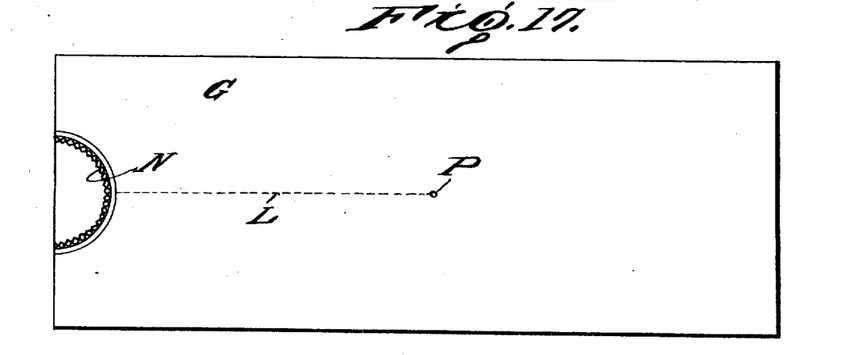
Fig. 17 is a diagrammatic view showing the blank from which an undergarment is to be formed by slitting and facing the front portion thereof.
Figure 18:
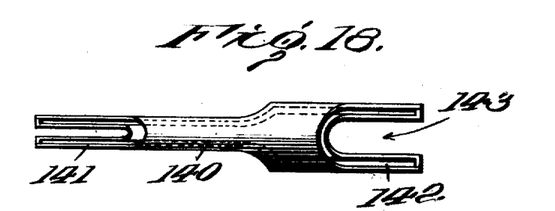
Fig. 18 is a front view of the folder.

Before describing in detail the fabric guiding devices, attention is called to Figs. 16, 17 and 18, and to one use to which the invention may be applied. In Fig. 17 I have shown the body garment, indicated at G, which is formed with a finished neck opening, indicated at N. This body garment has been folded or creased along the line L. It is desired to slit the body fabric from a point indicated at P to the neck opening and to finish the edge portions alongside of the slit. The cutting mechanism referred to above operates to cut or slit the garment along the line leading from the point P to the neck opening, or, if desired, from the neck opening to the point P.

As indicated in Fig. 16 of the drawings, the edge portion G' along one side of the slit formed in the body fabric is covered by a button stay strip S. This button stay strip is folded about the edge of the body fabric and is stitched by the needle 12, which needle passes down through the inner edges of the button stay strip and the body fabric. The other edge portion G² alongside of the slit is faced on one side thereof by a facing strip, indicated at F. This facing strip is secured to the body fabric by the needles 6, 7 and 13, the needles 6 and 7 being disposed so as to cover the edge of the fabric. A small facing strip F' may be fed to the needles 6 and 7 for covering the upper face of the edge or, if desired, a cross thread may be laid back and forth and secured by the needle threads of the needles 6 and 7, as is common practice in the sewing machine art.

The guiding devices as embodied in the machine are designed particularly for handling the button stay strip and the facing strip. The button stay strip S is led from a suitable source of supply to a guiding device 139 along the upper face of the work supporting arm 4, and at one side of the stitching mechanism and the presser feet, as clearly shown in Fig. 16 of the drawings. At a point in advance of the needles, this stay strip is led into a folding guide 140 shown in detail in Fig. 18 of the drawings. The receiving end 141 is cut at an angle of 45° to the longitudinal axis of the folding device so that the strip may be inverted and led into the folding device in the reverse manner of handling a binding strip in the well-known English binder. The delivery end 142 of said folding device is also cut at an angle of 45° so that the strip is again inverted and led in a direction at right angles to the path of movement of the strip through the folding device. This delivery end of the folding device is shaped so that the guiding channels for the side faces of the strip are separated, thus forming a recess 143.

Figure 19:
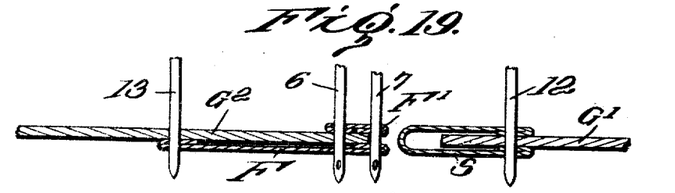
Fig. 19 is a view showing diagrammatically one manner of finishing the slitted edges of the garment.

The edge portion G' of the body fabric is led through this recess 143 and, therefore, the stay strip as it is inverted and delivered by the folding device 140 will be positioned so as to cover both the upper and lower faces of the edge portion of the body fabric along one side of the slit. The inner edges of the stay strip may be infolded, as shown in Fig. 19, or they may be straight and unfolded provided the edges are selvage edges. The folding device is formed in the well-known manner, either to fold the edges or let the edges run straight, as desired. This folding device 140, as above noted, is in front of the needles and in front of the presser feet, but is in rear of the cutting devices.

The facing strip F is led from a suitable source of supply over a guide bar 144 carried by a bracket 145 secured to the under face of the work supporting arm, see Fig. 1. It is then led through guiding devices 146 and 147 and thence upwardly through a slot 148 in the work supporting arm. Said strip passes through another slot 148 in the upper face of the work supporting arm and passes just in rear of the cutting devices. Said strip is then directed underneath the folding devices 140 and beneath the presser foot 97. If a second facing strip F' is used, this is fed directly beneath the presser foot 97 and to the needles 6 and 7.

*Method of applying facing strips.*

From the above it will be apparent that I have provided a new method of simultaneously applying a button and button hole facing strip to a garment, which consists in cutting a slit in the garment and during such cutting operation and simultaneously therewith sewing to each cut edge a facing strip. In order to accomplish this means are provided for stitching which includes two pairs of needles. Means are also provided for slitting the garment and means for guiding a facing strip independently of the garment to each of the cut edges of the garment during the sewing thereof by the needles.

*Operation.*

In the operation of my device, the tubular body fabric, such as shown at G in Fig. 17, is placed in the machine, first the stationary cutter having been raised so as to permit the insertion of the same. Of course, the presser foot and the needles are both raised and a portion of the garment at the right of the point P is placed underneath the presser foot and the point P directly underneath the piercing point 134 of the cutting blade 131. The cutting blade is then lowered by shifting the lever 135, the spring 123 forcing the cutting blade downwardly. The piercing point enters the fabric, after which the cutting blade 133 slits the fabric. The fabric then may be moved rearwardly. Of course, if desired, the cutting blade 133 may be again raised by hand and the length of the slit made longer by a separate operation thereof.

The fabric with this initial slit therein is then moved rearwardly and the right hand edge portion G', as viewed in Fig. 16, is placed in the recess 143 of the folding device 140. The machine is then set into operation, and as the material is fed onto the arm of the machine, the button stay strip S is placed about the edge portion G' and stitched thereto by the needle 12, while the facing strip F is stitched by the needles 6, 7 and 13 to the other edge portion G² of the body fabric, thus finishing the edges of the slit. This slitting of the fabric extends into the neck opening, and the edges will be finished to the neck opening.

The feeding mechanism, as above described, is of a character which includes a main feed dog and an auxiliary feed dog which is given a differential movement relative to the main feed dog. One of the fabric engaging sections 64 of the main feed dog and the cooperating auxiliary feed dog 77 feed the stay strip, while the auxiliary feed dog engages the edge portion G' of the body fabric in advance of the stay strip and thus prevents any stretching of the stay strip. The stitching mechanism operates in the usual manner for stitching the stay strip and the facing strip to the edge portions of a body fabric.

It is obvious that many other ways of finishing the edge portions alongside of the slit may be provided, using different forms of guides or folders, the essential features of the machine consisting in the slitting of the fabric and the preparing of the edges of the slitted fabric after passing the cutting mechanism and before reaching the stitching mechanism for the finishing of said edges, and my preferred means consists in the guiding of the button stay strip and the facing strip as above described.

Figure 20:
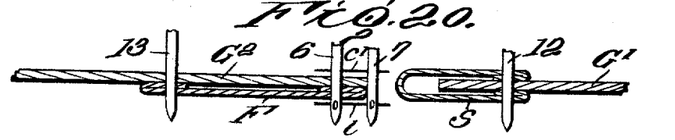
Fig. 20 is a view similar to Fig. 19, but showing the extreme edges along one side of the slit as covered by a cross thread.
Figure 21:
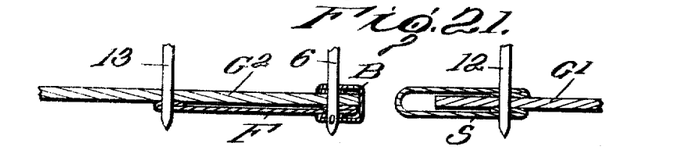
Fig. 21 is a view similar to Fig. 19, but showing a binding for finishing one edge of the slit.
Figure 22:
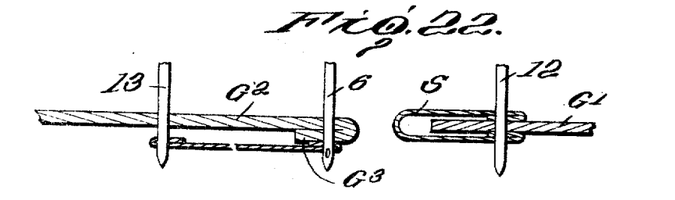
Fig. 22 is a view similar to Fig. 20 but showing one edge portion of the body fabric turned in for finishing the same.

In Fig. 20 of the drawings, I have shown the edge portion G² as finished by a facing strip F and by cross threads C' stitched down by the needles 6 and 7 above the edge of the fabric and by a looper thread $l$ beneath the fabric. In Fig. 21 I have shown the edge portion G² as finished by a facing strip F and by a binding, indicated at B, which binding may be readily directed to the machine by a suitable binder attached to the presser foot or the work support. In Fig. 22, I have shown the edge portion G² as finished by means of a facing strip F and by turning in the edge of the body garment, as indicated at G³. In this figure, and also in Fig. 21, a single needle is shown for finishing the one edge of the fabric section G².

Figure 23:
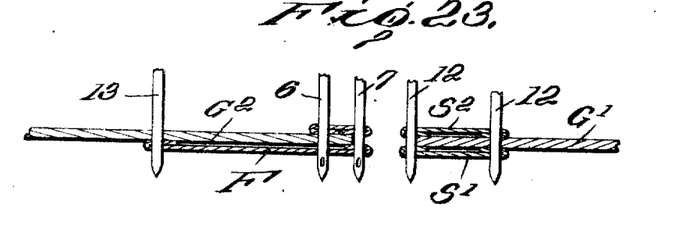
Fig. 23 is a view similar to Fig. 19 but showing the button stay strip as formed in two sections.

In Fig. 23, I have shown the edge portion G' as finished by a button stay strip formed in two sections S' and S², in which case two needles are used for stitching the same. It will be perfectly obvious how the machine may be equipped with the necessary guiding devices for carrying out these various modifications in the finishing of the edge portions of the slit.

Perhaps it should have been stated that in carrying out the operation described in connection with Fig. 17 the upper feed dog is removed and also the supporting standard therefor so as to provide a free space for the tubular garment to pass underneath the overhanging arm. If the garment operated upon is, however, a union suit wherein the slit extends from the crotch of the garment to the neck thereof, such a garment is usually slitted and finished before the leg portions are stitched together and, therefore, the finished sections may fall to the sides of the work supporting arm and the upper feed dog may be used as the standards supporting the same would not interfere with the free movement of the fabric. The auxiliary feed dog on the left, as the machine is viewed from the front end thereof, is also timed so as to move in unison with the feed dog sections associated therewith when a facing strip is stitched to the garment, as shown in the drawings. If, however, no facing strip is used and the edge portion of the garment is turned in so that the feed dog operates upon the elastic knitted web of the fabric, then the auxiliary feed dog on the left may be given a differential feeding movement.

It is obvious that minor changes in the details of construction and the arrangement of the parts may be made without departing from the spirit of the invention as set forth in the appended claims.

Having thus described my invention, what I claim as new and desire to secure by Letters-Patent is:—

1. A sewing machine including in combination, a work support, a feeding mechanism, a stitching mechanism, a movable cutting device, a normally stationary cutting device cooperating therewith, said devices being located in advance of the stitching mechanism, and means whereby the stationary cutting device may be raised above the surface of the fabric, the fabric then slitted within the marginal edges thereof, and the stationary cutting device lowered through said slit to normal operative position.

2. A sewing machine including in combination, a work support, a feeding mechanism, a stitching mechanism, a movable cutting device, a normally stationary cutting device cooperating therewith, said devices being located in advance of the stitching mechanism, and means whereby the stationary cutting devices may be raised above the surface of the fabric, the fabric then slitted within the marginal edges thereof, and the stationary cutting device lowered through said slit to normal operative position, said initial slitting device having a piercing point to facilitate the cutting of the fabric.

3. A sewing machine including in combination, a work support, a feeding mechanism, a stitching mechanism, a reciprocating cutting blade located above the work support, a normally stationary blade cooperating therewith and having its upper face flush with the surface of the work support, means whereby said normally stationary blade may be manually raised from the work support whereby a fabric may be inserted beneath the same, said normally stationary blade having a cutting device on its lower face adapted to initially slit the fabric to permit the stationary blade to pass therethrough to normal cutting position.

4. A sewing machine including in combination, a work support, a feeding mechanism, a stitching mechanism, a reciprocating cutting blade located above the work support, a normally stationary blade cooperating therewith and having its upper face flush with the surface of the work support, means whereby said stationary blade may be manually raised from the work support whereby a fabric may be inserted beneath the same, said stationary blade having a cutting device on its lower face adapted to initially slit the fabric to permit the stationary blade to pass therethrough to normal cutting position, said stationary blade having a piercing point at the rear edge of the cutting device for forming the slit in the fabric.

5. A sewing machine including in combination, a work support, a feeding mechanism, a stitching mechanism, a vertically sliding support, a reciprocating cutting device mounted thereon, a normally stationary cutting device carried by said sliding support, and means for manually raising said sliding support and said stationary cutting device, said stationary cutting device having a cutting blade at the lower edge thereof in line with the reciprocating cutting device for slitting the fabric to permit the stationary cutting device to pass therethrough.

6. A sewing machine including in combination, a work support, a feeding mechanism, a stitching mechanism, a vertically sliding support, a reciprocating cutting device mounted thereon, a normally stationary cutting device carried by said sliding support, a lever for raising said sliding support, a spring for normally depressing said lever, said stationary cutting device having a cutting blade at the lower edge thereof in line with the reciprocating cutting device for slitting the fabric to permit the stationary cutting device to pass therethrough.

7. A sewing machine including in combination, a work support, a feeding mechanism, a stitching mechanism, a vertically sliding support, a movable cutting device mounted to reciprocate on said sliding support, means for raising and lowering the sliding support, a forwardly projecting normally stationary cutting device carried by said sliding support and cooperating with said movable cutting device, said stationary cutting device having a cutting blade on its lower face projecting downwardly and in line with the movable cutting device for slitting the fabric to permit the stationary cutting device to pass therethrough in its normal cutting operation.

8. A sewing machine including in combination, a work support, a feeding mechanism, a stitching mechanism, a vertically sliding support, a movable cutting device mounted to reciprocate on said sliding support, means for raising and lowering the sliding support, a forwardly projecting normally stationary cutting device carried by the sliding support and cooperating with said movable cutting device, said stationary cutting device having a cutting blade on its lower face projecting downwardly and in line with the movable cutting device for slitting the fabric to permit the stationary cutting device to pass therethrough in its normal cutting operation, said cutting blade on said stationary cutting device having a piercing point at the rear end thereof to facilitate the cutting of the fabric within its marginal edges.

9. A sewing machine including in combination, a work support, a feeding mechanism, a stitching mechanism, a vertically sliding support, a movable cutting device mounted to reciprocate on said sliding support, means for raising and lowering the sliding support, a forwardly projecting normally stationary cutting device carried by the sliding support and cooperating with said movable cutting device, said stationary cutting device having a cutting blade on its lower face projecting downwardly and in line with the movable cutting device for slitting the fabric to permit the stationary cutting device to pass therethrough in its normal cutting operation, a lever for raising said sliding support, and a spring for normally depressing the same.

10. A sewing machine including in combination, a work support, a feeding mechanism, a stitching mechanism, a normally stationary cutting device located in advance of said stitching mechanism and having its upper face substantially flush with the work support, a cutting blade at the lower face of said stationary cutting device, means for supporting said stationary cutting device from a point above the work support, means for raising said stationary cutting device to bring the cutting blade above the material, and means for lowering said stationary cutting device to cause said cutting blade to form an initial slit in the material.

11. A sewing machine including in combination, a work support, a feeding mechanism, a stitching mechanism, a normally stationary cutting device located in advance of said stitching mechanism and having its upper face substantially flush with the work support, a cutting blade at the lower face of said stationary cutting device, means for supporting said stationary cutting device from a point above the work support, means for raising said stationary cutting device to bring the cutting blade above the material, and means for lowering said stationary cutting device to cause said cutting blade to form an initial slit in the material, said cutting blade having a piercing point at the rear end thereof.

12. The combination with a sewing machine having a suspended work supporting arm for stitching tubular articles, a feeding mechanism for feeding the material lengthwise of said arm, cutting devices located in advance of the stitching mechanism for slitting the fabric, one of said cutting devices being normally stationary and located beneath the fabric, means for supporting said stationary cutting device from above the fabric, means for raising and lowering said stationary cutting device, said stationary cutting device having a cutting blade on its lower face adapted to initially slit the fabric when lowered on the cutting line.

13. The combination with a sewing machine having a suspended work supporting arm for stitching tubular articles, a feeding mechanism for feeding the material lengthwise of said arm, cutting devices located in advance of the stitching mechanism for slitting the fabric, one of said cutting devices being normally stationary and located beneath the fabric, means for supporting said stationary cutting device from above the fabric, means for raising and lowering said stationary cutting device, said stationary cutting device having a cutting blade on its lower face adapted to initially slit the fabric when lowered on the cutting line, and a piercing point at the rear of the cutting blade.

14. The combination with a sewing machine having a suspended work supporting arm for stitching tubular articles, a feeding mechanism for feeding the material lengthwise of said arm, cutting devices located in advance of the stitching mechanism for slitting the fabric, and a strip guiding and folding device located between the cutting devices and the needles of the stitching mechanism, said folding and guiding device having its longitudinal axis disposed at right angles to the line of feed and the delivery end thereof disposed at an angle of forty-five degrees so as to permit a strip to be guided therethrough inverted and placed about one of the edge portions of the slitted fabric, the receiving end of said guiding and folding device being also disposed at an angle of forty-five degrees whereby the strip may be led to the folding and guiding device from a point in rear of the needles and in a direction parallel with the line of feed.

15. The combination with a sewing machine having a suspended work supporting arm for stitching tubular articles, a feeding mechanism for feeding the material lengthwise of said arm, cutting devices located in advance of the stitching mechanism for slitting the fabric, and means for guiding a fabric strip from below the work supporting arm up through the work supporting arm to a point between the stitching mechanism and the cutting devices.

16. The combination with a sewing machine having a suspended work supporting arm for stitching tubular articles, a feeding mechanism for feeding the material lengthwise of said arm, cutting devices located in advance of the stitching mechanism for slitting the fabric, a folding device between the cutting devices and the needles of the stitching mechanism for directing a stay strip about one of the edge portions of the slitted fabric, and guiding devices for guiding a facing strip along the other edge portion of the slitted fabric.

17. The combination with a sewing machine having a suspended work supporting arm for stitching tubular articles, a feeding mechanism for feeding the material lengthwise of said arm, cutting devices located in advance of the stitching mechanism for slitting the fabric, a folding device between the cutting devices and the needles of the stitching mechanism for directing a stay strip about one of the edge portions of the slitted fabric, and guiding devices for guiding a facing strip along the other edge portion of the slitted fabric, said last-named guiding devices being disposed so as to direct the strip up through the work supporting arm at a point between the cutting devices and the needles of the stitching mechanism.

18. A sewing machine including in combination a suspended work supporting arm, a feeding mechanism for feeding the fabric lengthwise of said arm, and a stitch forming mechanism including a needle disposed adjacent each side face of the arm, a looper cooperating with each needle and moving in a plane parallel with the line of feed, a needle located between said first-named needles and substantially centrally of the work supporting arm, and a looper cooperating with said last-named needle and moving in a plane at right angles to the line of feed.

19. A sewing machine including in combination a suspended work supporting arm, a feeding mechanism for feeding the fabric lengthwise of said arm, and a stitch forming mechanism including a needle disposed adjacent each side face of the arm, a looper cooperating with each needle and moving in a plane parallel with the line of feed, a needle located between said first-named needles and substantially centrally of the work supporting arm, and a looper cooperating with said last-named needle and moving in a plane at right angles to the line of feed, means for oscillating said last-named looper and for moving the same laterally for its needle avoiding movement, means for oscillating the first-named loopers, and means for moving said first-named loopers laterally for their needle avoiding movement from the means which gives to the last-named looper its lateral movement.

20. A sewing machine including in combination, a suspended work supporting arm, means for feeding a fabric lengthwise of said arm, stitching mechanism, cutting devices in advance of the stitching mechanism, said stitching mechanism including widely spaced needles disposed respectively at the side faces of said arm, a needle located substantially centrally of said arm, a looper cooperating with each needle at the side faces of said arm, and a looper cooperating with the needle disposed centrally of said arm.

21. A sewing machine including in combination, a suspended work supporting arm, means for feeding a fabric lengthwise of said arm, stitching mechanism, cutting devices in advance of the stitching mechanism, said stitching mechanism including widely spaced needles disposed respectively at the side faces of said arm, a needle located substantially centrally of said arm, a looper cooperating with each needle at the side faces of said arm, and a looper cooperating with the needle disposed centrally of said arm, the loopers cooperating with the needles at the side faces of the arm being disposed so as to move in planes parallel with the line of feed when entering and leaving the needle loops, and the looper cooperating with the centrally disposed needle being arranged so as to move in a plane at right angles to the line of feed when entering and leaving the needle thread loops.

22. The method of simultaneously applying button and button hole facing strips to a garment, which consists in cutting a slit in the garment and during such cutting operation and simultaneously therewith sewing to each cut edge a facing strip.

23. In a sewing machine, the combination of stitching mechanism comprising two pair of needles, means for cutting a slit in a garment, and means for guiding a facing strip independent of such garment to each of the cut edges of the garment during the sewing thereof by said needles.

In testimony whereof, I affix my signature.

ROBERT R. HUGHES, Jr.